United States Patent [19]

Fowler et al.

[11] Patent Number: 5,472,273
[45] Date of Patent: Dec. 5, 1995

[54] SYSTEM FOR DETERMINING THE DEVELOPMENT STATUS OF A MASS SUCH AS BREAD DOUGH IN A POWERED MIXER

[75] Inventors: Eddie R. Fowler, Manhattan, Kans.; Chen-Kang Wang, Dearborn Heights, Mich.

[73] Assignee: Kansas State University Research Foundation, Manhattan, Kans.

[21] Appl. No.: 67,713

[22] Filed: May 26, 1993

[51] Int. Cl.$^6$ ............................................. A21C 1/00
[52] U.S. Cl. ........................ 366/69; 366/601; 426/231; 426/504; 426/519
[58] Field of Search .................. 366/69, 96–100, 366/142, 206, 349, 601; 425/135, 200; 99/348; 426/231, 504, 519

[56] References Cited

U.S. PATENT DOCUMENTS

| | | | |
|---|---|---|---|
| 1,279,143 | 9/1918 | Patterson | 366/348 |
| 4,002,891 | 1/1977 | Porter | 366/98 X |
| 4,027,859 | 6/1977 | Stone | 366/142 |
| 4,076,220 | 2/1978 | Nakashima et al. | 366/69 |
| 4,311,397 | 1/1982 | Wright | 366/98 |
| 4,766,766 | 8/1988 | Ahlert et al. | 366/98 X |
| 4,790,665 | 12/1988 | Hayashi | 426/504 X |

FOREIGN PATENT DOCUMENTS

| | | | |
|---|---|---|---|
| 428241 | 5/1991 | European Pat. Off. | 366/69 |
| 206877 | 2/1984 | Germany | 366/69 |
| 217697 | 1/1985 | Germany | 366/69 |
| 291000 | 6/1991 | Germany | 426/504 |
| 61-146507 | 7/1986 | Japan | 366/69 |
| 61-219333 | 9/1986 | Japan | 366/69 |
| 556744 | 3/1993 | Japan | 426/504 |
| 1157530 | 5/1985 | U.S.S.R. | 366/69 |
| 1026308 | 4/1966 | United Kingdom | 366/601 |
| 1308244 | 2/1973 | United Kingdom | 366/69 |
| 8902701 | 4/1989 | WIPO | 366/69 |

*Primary Examiner*—David Scherbel
*Assistant Examiner*—Charles E. Cooley
*Attorney, Agent, or Firm*—Hovey, Williams, Timmons & Collins

[57] ABSTRACT

A system determines the development status of a mass such as bread dough in a powered mixer by applying a set of expert rules to qualitative variables determined from the elapsed mixing time and instantaneous power flow to the mixer over time. The preferred apparatus includes a monitor for tracking the instantaneous power flow coupled with a computer for determining the variables and applying the rules stored in computer memory.

25 Claims, 5 Drawing Sheets

5,472,273

SYSTEM FOR DETERMINING THE DEVELOPMENT STATUS OF A MASS SUCH AS BREAD DOUGH IN A POWERED MIXER

BACKGROUND OF THE INVENTION

1. Field of the Invention

The present invention relates to the field of bread dough preparation. The preferred embodiment determines the development status of bread dough in a powered mixer by applying a set of expert rules to qualitative variables determined from the elapsed mixing time and instantaneous power flow to the mixer over time.

2. Description of the Prior Art

Typical white pan bread is composed of the ingredients of water, flour, yeast, sugar, salt and reducing agents. In the commercial preparation of white pan bread, the mixing of the bread dough is the most important processing step. During the mixing, three important processes occur. The first is the blending of the ingredients to achieve a thorough dispersion into a homogeneous mixture. The second process is absorption of the water into the other ingredients, primarily the flour. The third is development of the gluten protein of the flour into a three dimensional matrix so that air is retained during fermentation and so that the bread presents the desired texture and loaf volume.

In commercial bakeries, dough mixing is accomplished in a mixing machine controlled by an experienced and highly skilled baker. The baker judges the characteristics of the dough by smelling, looking and stretching the dough, and by listening to the sound of the mixer's motor. Subjective judgments based on these characteristics are necessary because the attributes of the dough vary from batch to batch. These inconsistencies are due primarily to variations in the flour including its water absorbing capacity and gluten content.

In order to eliminate the need for subjective judgment in the mixing process, one prior art approach is to control the mixing process on the basis of input energy provided to the mixer. For a given mixer and batch size, the amount of delivered energy is directly related to the elapsed mixing time. In this prior art approach, the time set for the mixing cycle is determined by laboratory analysis of the flour protein strength. Unfortunately, the protein strength may drift from batch to batch and dramatic changes can occur when the flour changes to a different source.

Another approach is to integrate the instantaneous input power into a single line curve that reflects the relative consistency of the dough being mixed. This approach, however, only indicates the magnitude of input power which does not provide a correct indication of gluten development.

Other approaches monitor torque on the mixer shaft or rely heavily on laboratory testing before each batch. As those skilled in the art appreciate, none of the prior art techniques provide a reliable real time indication of water absorption and optimal gluten development.

SUMMARY OF THE INVENTION

The present invention solves the prior art problems discussed above and provides a distinct advance in the state of the art. More particularly, the system hereof provides a reliable real time indication of the development status of bread dough being prepared in a powered mixer.

The preferred apparatus includes a powered mixer, a power monitor coupled with the mixer for sensing the instantaneous power delivered thereto, and a controller coupled with the monitor for determining the elapsed mixing time, for deriving a set of qualitative variables, and for determining whether these variables satisfy predetermined conditions stored in memory. The controller is operable for deriving the statistical mean, standard deviation, low frequency energy, and the change of each, for the input power over time. From this information, the qualitative variables are determined including the water absorption level, and gluten development status, with respect to real time. The conditions stored in memory are preferably a set of control rules in linguistic form. By applying the control rules to the qualitative variables, the development status of the dough with respect to real time is determined.

DETAILED DESCRIPTION OF THE PREFERRED EMBODIMENT

By way of background, dough mixing can be considered as progressing through six stages: blending, pickup, cleanup, development, letdown, and breakdown. The blending stage is usually conducted at a low mixing speed and is the initial stage for blending the dough ingredients.

After ingredient blending, the mixer is activated to high speed which marks the pickup stage. In this stage, the different flour proteins begin to link together to form long chains or strings known as "gluten."

The cleanup stage is characterized by formation of the dough into a more cohesive and hard mass. This is the result of the gluten chains beginning to form into a three dimensional matrix. It is this gluten matrix that provides the structure to the dough. In this condition, the mixer bars throw the dough against the mixer walls and the instantaneous input power surges with every pass of the mixer arms through the dough mass.

In the development stage, the long gluten protein chains become more intermixed or tangled and present a stronger three dimensional matrix. As a result, the dough presents a drier, more glossy appearance and becomes more elastic. As the dough mass winds around the mixer arms and breaks against the back wall of the mixer, it exhibits a distinctive audible rhythm.

The end of the letdown stage is the desired end of the mixing process because the dough has achieved the ideal development status. The dough presents a silky appearance and stretches into smooth, long sheets without breaking. In this condition, the dough is ready to be discharged from the mixer.

If dough is mixed too long, it loses its elastic characteristic and becomes wet, soft and excessively slack. The over mixing causes the gluten chains to separate into a more linear configuration resulting in a drastic reduction in the level of polymerization. This is the breakdown stage and the dough is of no use for making quality bread.

Figure 1:
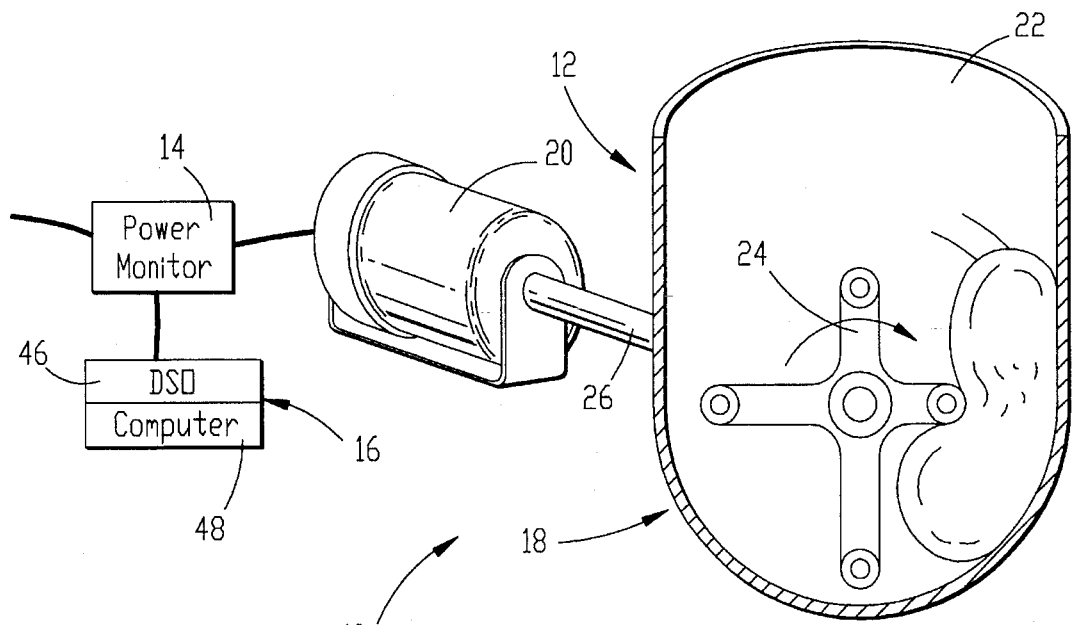
FIG. 1 is a schematic representation of the preferred apparatus in accordance with the present invention.

Turning now to FIG. 1, apparatus 10 includes powered mixer 12, power monitor 14, and controller 16. Mixer 12 is preferably a PEERLESS, 200 pound, horizontal mixer including mixer body 18 and a three phase, TEFC (totally enclosed, fan cooled) induction motor 20 operable at low and high speeds. As illustrated, mixer body 18 includes housing 22 and rotatable mixing bars 24 coupled with motor 20 by chain driven gear box and shaft 26.

Figure 1A:
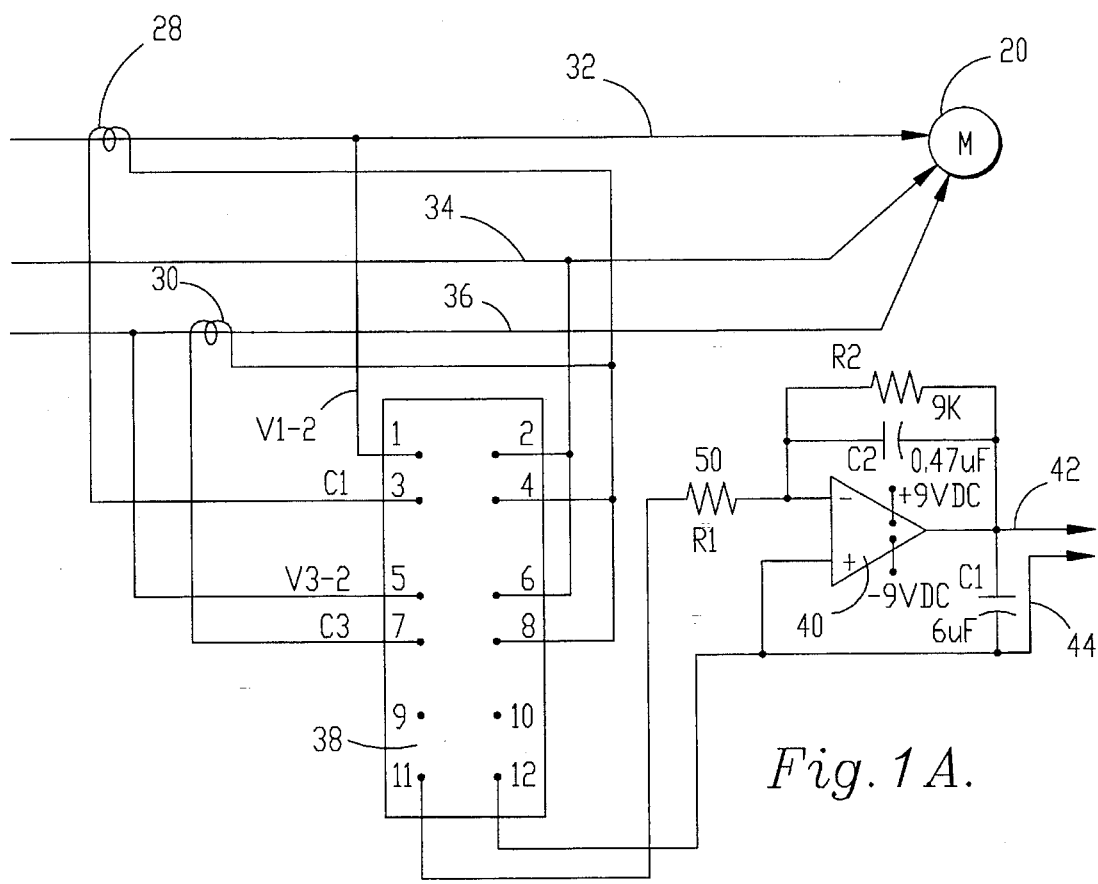
FIG. 1A is an electrical schematic diagram of the power monitor of FIG. 1.

FIG. 1A is an electrical schematic diagram of conventional, three phase, power monitor 14 using two Hall effect transducers for producing a D.C. output proportional to instantaneous A.C. input power. As illustrated, monitor 14 is connected using the conventional two-element wattmeter method. More particularly, monitor 14 includes current transformers (CT) 28 and 30 respectively coupled with phases one and three of electrical lines 32, 34, and 36 providing power to motor 20. CTs 28 and 30 transform the maximum 25 ampere current load to motor 20 to a maximum of 5 amperes. Monitor 14 further includes transducer 38 (Ohio Semitronics, Inc., Model #P-144E), operational amplifier 40 (type CA3140), resistors R1 (50 Ohms) and R2 (9K Ohms), and capacitors Cl (6 uF) and C2 (0.47 uF). One line from each CT 28, 30 are connected in common to terminals 4 and 8 of transducer 38 with the other CT lines connected with terminals 3 and 7 respectively as shown. Additionally, voltage inputs are provided to transducer 38 by connecting line 32 to terminal 1, line 34 to terminals 2 and 6, and line 36 to terminal 5.

Terminals 11 and 12 of transducer 38 produce a D.C. output with terminal 11 connected by way of resistor R1 to the negative input terminal of amplifier 40. Terminal 12 is connected to the positive input terminal of amplifier 40 and to one side of capacitor C1; the opposite side of C1 is connected to output line 42. Feedback is provided by connecting amplifier output line 42 with the negative input terminal by way of resistor R2 and capacitor C2 coupled and parallel. Output line 44 is connected to terminal 12. Output lines 42 and 44 are connected to controller 16 and provide an output thereto at a nominal 5 VDC representative of instantaneous power flow to motor 20. The instantaneous power readings range between 0 and 15 kilowatts for the preferred mixer.

The illustrated controller 16 includes a Hewlett-Packard digital oscilloscope (DSO) 46 that receives the power signals delivered on lines 42 and 44 at a sampling rate of 200 Hz. DSO 46 then digitizes the analog input power signal and stores the digitized power flow transient wave form at a time base of 5 seconds in real time. This 5 second window of data is then stored as a data "frame." Appendix I illustrates the preferred software written in HP BASIC for setting up the DSO data acquisition, display, analog-to-digital conversion, and data transmission. This software records the input power data and also the elapsed mixing time. A general purpose interface bus transfers the digitized power signal from the output buffer of the DSO to a personal computer 48, preferably Hewlett-Packard model HP-216 or other IBM compatible personal computer with resident memory. The data acquisition and processing operation occurs on an ongoing basis during mixing of a batch of dough. Computer 48 is programmed using conventional techniques to perform the functions described herein.

About fifty data frames are required in a typical batch of dough mixing with each data frame containing 1,001 data points within the time base of 5 seconds. From this information concerning the instantaneous power flow to mixer 12, computer 48 determines the statistical mean, standard deviation, and the Fast Fourier Transform (FFT) low frequency energy using MATLAB (off-line), an interactive system and programming language for scientific computation and signal processing. In the preferred embodiment, the FFT presents a low pass cutoff frequency of 1.4 Hz.

Figure 2A:
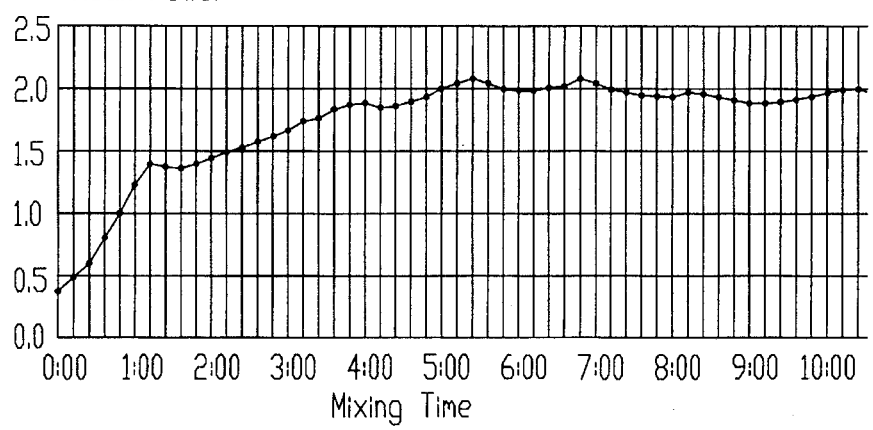
FIG. 2A is a graph of the statistical mean of the instantaneous power input to the apparatus of FIG. 1 over time for optimally developing gluten.
Figure 2B:
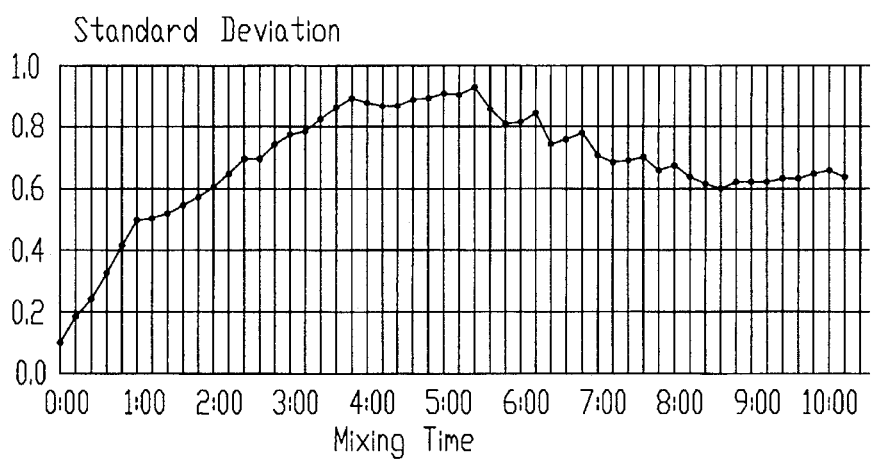
FIG. 2B is a graph of the statistical standard deviation of the instantaneous power input to the apparatus of FIG. 1 over time for optimally developing gluten.
Figure 2C:
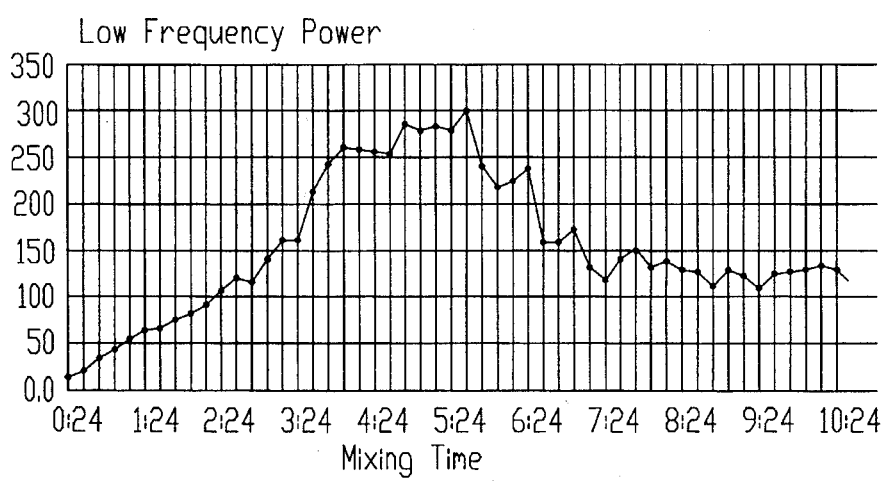
FIG. 2C is a graph of the low frequency power of the instantaneous power input to the apparatus of FIG. 1 over time for optimally developing gluten.

It has been empirically determined that the mean is related to the "stretch" strength of the dough, the standard deviation is related to the dough's cohesiveness, and the FFT is related to the viscoelasticity. FIGS. 2A, 2B and 2C are graphical illustrations of these three parameters over time for an actual "good" batch of dough. As illustrated, data smoothing is performed by averaging the mean, standard deviation and FFT for every 5 data frames.

Figure 3A:
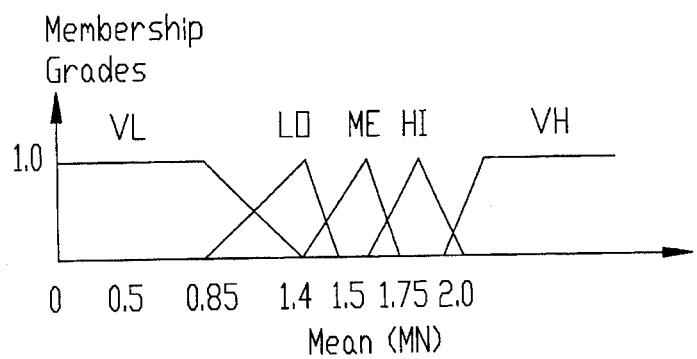
FIG. 3A is a graph of membership grades versus the mean's referential set of FIG. 2A.
Figure 3B:
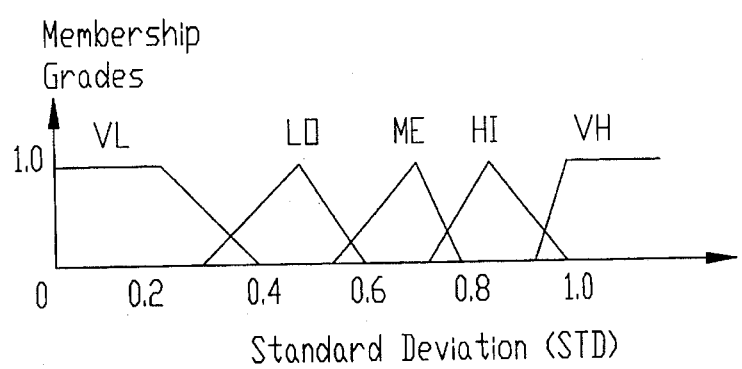
FIG. 3B is a graph of membership grades versus the standard deviation's referential set of FIG. 2B.
Figure 3C:
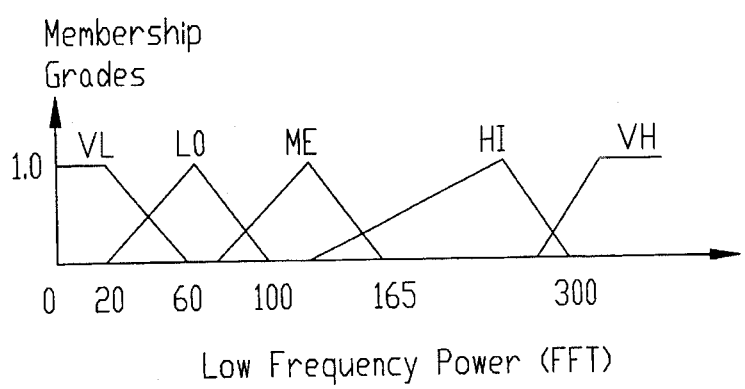
FIG. 3C is a graph of membership grades versus the low frequency power's referential set of FIG. 2C.
Figure 4:
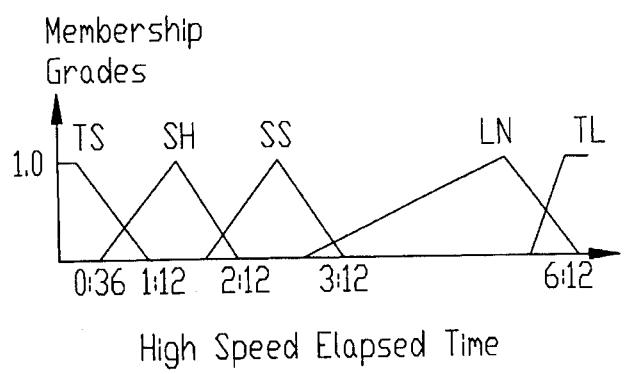
FIG. 4 is a graph of membership grades versus elapsed high-speed mixing time's of the apparatus of FIG. 1.

FIGS. 3A–C and 4 illustrate the next step in the operation in which the mean, standard deviation (STD), FFT and high speed elapsed time are converted to qualitative variables suitable for use in the preferred linguistic rule base illustrated in Appendix II using so-called "fuzzy" logic. The Appendix includes the fuzzy logic rules formatted as a look-up table, as well as the rules in linguistic format. More particularly, FIGS. 3A–C illustrate the qualitative variables corresponding to the empirically derived labels of very low (VL), low (LO), medium (ME), high (HI) and very high (VH) respectively for MN, STD and FFT. FIG. 4 illustrates the labels for elapsed time including too short (TS), short (SH), slightly short (SS), long (LN) and too long (TL). As will be noted, adjacent labels overlap allowing a given input value to fall within one or two labels. The membership grade represents the weighting of the belief value within the label.

As an example (see FIG. 3A), a mean value of the referential set of 1.7 falls within ME at a membership grade of 0.2 and also within HI at a membership grade of 0.7. Similarly (see FIG. 3B), a standard deviation value of 0.87 falls only within range HI at a membership grade of 0.9. An FFT value of the referential set of 155 (see FIG. 3C) falls within range ME at a membership grade of 0.1 and within range HI at a membership grade of 0.5. An elapsed time value of the referential set of 3:24 (3 minutes, 24 seconds) falls within range LN with a membership grade of 0.25 (see FIG. 4).

Figure 5A:
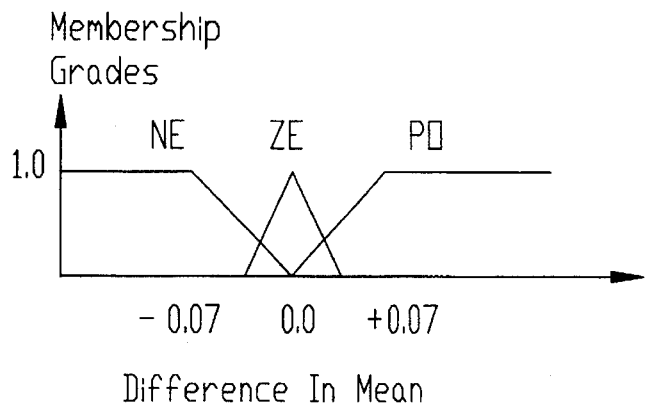
FIG. 5A is a graph of membership grades versus the difference in the mean's referential set of FIG. 3A.
Figure 5B:
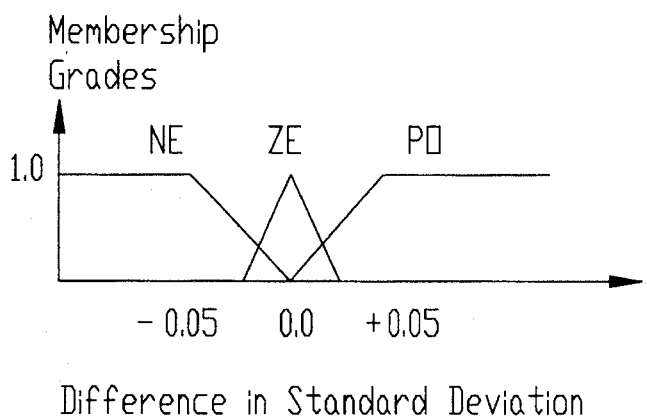
FIG. 5B is a graph of membership grades versus the difference in the standard deviation's referential set of FIG. 3B.
Figure 5C:
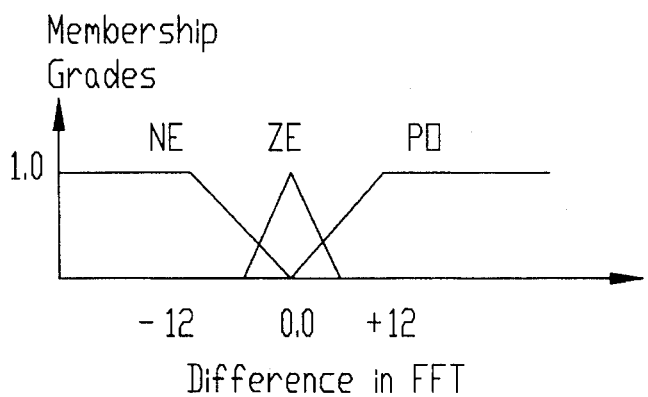
FIG. 5C is a graph of membership grades versus the difference in low frequency power's referential set of FIG. 3C.

Additionally, qualitative variables concerning the change in the mean, standard deviation and FFT are also determined on an ongoing basis as illustrated in FIGS. 5A–C corresponding to a negative (NE), zero (ZE), and positive (PO) changes. As illustrated, these labels overlap allowing data to fall in one or two ranges.

Next, the qualitative variables are used to determine the gluten development of the dough being prepared in mixer 12. The first step is to determine gluten development with respect to dough strength or resistance as related to the mean (GM), dough cohesiveness as related to the standard deviation (GSTD), and viscoelasticity as related to FFT (GFFT). Using the example from above, these levels of gluten development can be represented as the union of the discrete sets:

$$GM=0/VL+0/L+0.2/ME+0.7/HI+0/VH$$

$$GSTD=0/VL+0/L+0/ME+0.9/HI+0/VH$$

$$GFFT=0/VL+0/L+0.1/ME+0.5/HI+0/VH$$

where the coefficients represent the membership grade. The total gluten development can be represented as the set union:

$$GLUD=GM+GSTD+GFFT$$

where "+" denotes set union in which the maximum of each label is taken for the total. Thus:

$$GLUD=0/VL+0/L+0.2/ME+0.9/HI+0/VH$$

Similarly, the "change" variables CGM, CGSTD and CGFFT are determined from the conversion discussed in connection with FIGS. 5A–C from which the total change in gluten development can be derived as CGLUD.

The qualitative variables GLUD and CGLUD along with high speed elapsed time (HSET) (from FIG. 4) are used as the premises of the linguistic rules set forth in Appendix II. These rules are in the form of a conditional statement, i.e.: if "X" then "Y" where "X" represents the qualitative variables and "Y" represents the development stage of the dough such as "pickup" or "cleanup" and also represents a desired action such as "increase water." Each rule is continuously applied to each of the three qualitative variables which, as described above, are continuously updated in a real time manner during the mixing cycle. When the conditions for a rule are satisfied, the rule is said to "fire."

Using the example from above, gluten development GLUD is both medium (ME) and high (HI) which is possible because of the overlapping ranges, and high speed elapsed time (HSET) is long (LN). Assuming that the change in gluten development CGLUD is positive (PO), then rule 18 is the only rule in which all of the antecedent conditions are satisfied. This leads to the rule outputs that the dough absorption status is "properly absorbed," dough mixing status is at the "development" stage, and the recommended action concerning the absorption level is to "leave alone."

As can be observed from inspection of the other rules, the mixing process is continuously evaluated in real time as the dough progresses through the various development stages and outputs are provided indicating the development status of the dough and recommending any corrective action that may be needed. For example, if the conditions for rule 2 are satisfied, a recommendation is provided to "slightly increase water." In contrast, if the conditions for rule 10 are satisfied, the recommendation is to "decrease water," which means to add more flour to the dough.

The following sets forth another example in the operation of the present invention:

$$GLUD=0/VL+0.3/LO+0.8/ME+0/HI+0/VH$$

$$HSET=0/TS+0.7/SH+0/SS+0/LN+0/TL$$

$$CGLUD=0/NE+0/ZE+1/PO$$

Because GLUD is both low and medium, both rules 6 and 7 are firing. This results in seemingly contradictory recommendations to both slightly decrease water and to slightly increase water. This apparent conflict is resolved by taking into account the membership grades in determining a specific or "crisp" value for the dough development status and recommendation for a percentage change in water content.

Figure 6A:
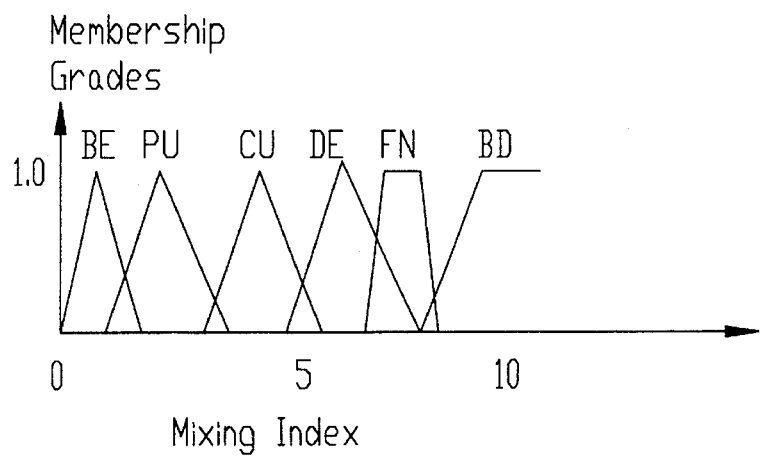
FIG. 6A is a graph illustrating the determination of a precise mixing index number concerning the gluten development status of the dough in the apparatus of FIG. 1.
Figure 6B:
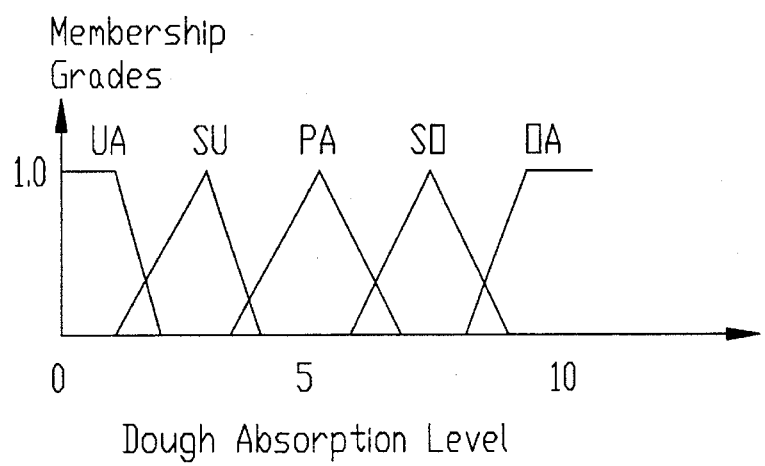
FIG. 6B is a graph illustrating the determination of a precise dough absorption level concerning the dough in the apparatus of FIG. 1.
Figure 6C:
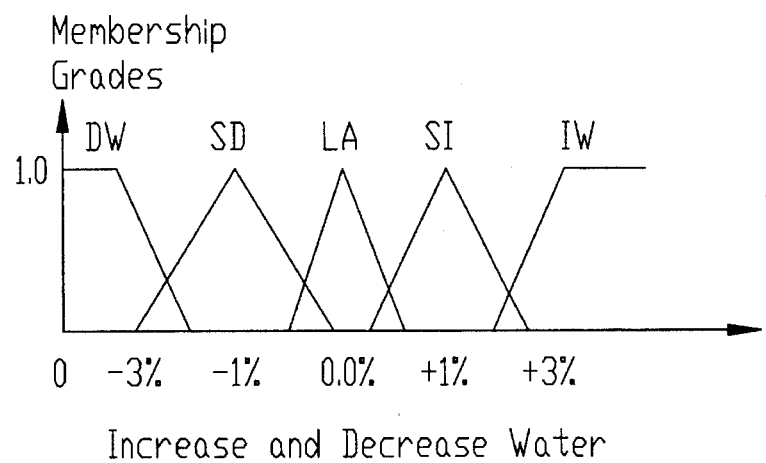
FIG. 6C is a graph illustrating the determination of a precise water change level for the dough in the apparatus of FIG. 1.

First, the conjunction or minimum of each antecedent membership label for each rule is applied using the Compositional Rule of Inference to truncate the area under each consequent membership label as illustrated in FIGS. 6A–C. For the example, this is applied as follows:

Rule 5=0.3/LO ∧0.7/SH ∧1.0/PO=0.3

Rule 7=0.8/ME ∧0.7/SH ∧1.0/PO=0.7

These values of 0.3 and 0.7 are used to truncate the areas under the corresponding curves in FIGS. 6A–C. More specifically, Rule 5 indicates that the development status is at pickup (PU) and the truncated value for Curve PU is 0.3. This is indicated by the hash-marked area under the PU curve in FIG. 6A. Similarly, for Rule 7 the development status is cleanup (CU) with the truncated value being 0.7. This is indicated by the stippled area under the CU curve of FIG. 6A. These two areas together form a combined area (the overlap is only included once and specifically in the largest area). Using the centroid technique, the mathematical moment of the combined area is then calculated with reference to the origin. This moment represents the center of mass of the combined area and is indicated by the arrow in FIG. 6A. From this, it can be seen that the mixing stage is weighted toward cleanup (CU).

The same process is followed for determining a numerical value for the dough absorption level. As indicated by the arrow in FIG. 6B, the dough absorption level is closer to slightly underabsorbed (SU). In FIG. 6C, this process indicates that the output recommendation is to increase the water content by 0.8%. Thus, the apparent conflict is resolved and results in a specific recommendation.

The outputs concerning absorption, water and development status can be presented on the display monitor of computer 48 to the operator of apparatus 10, and can also be connected to the control for mixer 12. For example, the water recommendation can activate a water valve for addition of the specified water amount or flour valve for addition of the needed flour amount, and a development status of "final" or "breakdown" can shut off the mixer.

It will thus be understood that the three outputs of the fuzzy logic control system are Mixing Index, Dough Absorption Level and Recommended Action (increase/decrease water). The desired output, for a properly mixed batch of dough, is a Mixing Index of FN and a Dough Absorption Level of PA, i.e., a Recommended Action of LA. The Dough Absorption Level and the Recommended Action have a one-to-one relationship with each other. Therefore, if one is determined, calculating the other gives redundant information.

The data acquisition and digital signal processor described previously can readily be replaced by a more compact, advanced system. For example, use can be made of a Motorola integrated circuit (IC) board (MC68HC11). This board will have the following IC chips: MC68HC11 microprocessor; asynchronous communications interface adapter (ACIA) chip; analog-to-digital conversion (ADC) chip; multiplexer chip; electronically erasable programmable read only memory (EEPROM) chip; random access memory (RAM) chip; and other IC chips as needed. The ADC processing; multiplexing commands, calculations for the mean, standard deviation, and FFT; communications commands; and storage processes will be programmed in assembly language and stored on the HC11 board's EEPROM. This board occupies about 16 cubic inches and is powered by about 10 watts from +5 VDC, +12 VDC, and −12 VDC power supplies. By contrast, the previously described apparatus occupies about 10 cubic feet of space and is powered by about 400 watts from a 117 VAC source.

While the fuzzy logic control system described above provides excellent real time feed back control in the context of dough development, it will be understood that the invention is not so limited. That is, the system can provide appropriate feed back control of any process wherein a conglomerate mass is mixed, and in which there is a polymerization of the mass during the mixing process. It is desirable that the process non-intrusively sense the state of the polymerization process by measuring the torque required to accomplish the powered mixing, the mixing time, and the temperature of the conglomerate mass. Within the context of these conditions, many food and chemical mixing and extrusion processes can be controlled using the invention.

As those skilled in the art will appreciate, the present invention encompasses many variations in the preferred embodiment described herein. Having thus described the preferred embodiment of the present invention, the following is desired to be secured by Letters Patent.

We claim:

1. An apparatus for use with a powered mixer for determining the development status of an agglomerated mass prepared in the powered mixer, said apparatus comprising:

sensing means for sensing the input power to the mixer and for producing power signals representative thereof; and signal processing means for receiving said power signals and responsive thereto for determining the development status of the mass in the mixer, said signal processing means including means for deriving from said power signals a set of qualitative variables related to the development status of the mass, memory means for storing at least one qualitative status parameter in association with conditions that can be satisfied by said qualitative variables, and means for determining whether said variables satisfy said conditions and for selecting said at least one status parameter upon satisfaction of said conditions.

2. The apparatus as set forth in claim 1, said mass including dough.

3. The apparatus as set forth in claim 2, said qualitative variables including gluten development.

4. The apparatus as set forth in claim 2, said qualitative variables including water absorption.

5. The apparatus as set forth in claim 2, said signal processing means including means for determining power variables including at least one of the mean, standard deviation, and frequency of change of the input power over time, and including means for deriving said qualitative variables from said power variables.

6. The apparatus as set forth in claim 5, said mean, standard deviation, and frequency of change of the input power over time being subject to change, said power variables further including at least one of any change in said mean, standard deviation and frequency of change.

7. The apparatus as set forth in claim 2, said memory means including means for storing a plurality of qualitative status parameters and for storing a set of conditional statement rules incorporating said qualitative status parameters and conditions.

8. The apparatus as set forth in claim 7, said rules including at least one rule for indicating the development status of the dough as one of said status parameter upon satisfaction of conditions concerning gluten development.

9. The apparatus as set forth in claim 8, said gluten development being subject to change, said conditions concerning gluten development including at least one of current gluten development, the change in gluten development and the elapsed mixing time of the dough.

10. The apparatus as set forth in claim 7, said rules including at least one rule for indicating the development status of the dough as one of said status parameter upon satisfaction of conditions concerning water development.

11. The apparatus as set forth in claim 10, said one status parameter including an indication concerning whether any change is needed in the relative amounts of water and flour in the dough.

12. The apparatus as set forth in claim 2, said qualitative variables being representative of respective ranges concerning said power signals.

13. An apparatus for use with a powered mixer for determining the development status of dough prepared in the powered mixer, said apparatus comprising:

sensing means for sensing the input power to the mixer and for producing power signals representative thereof; and signal processing means for receiving said power signals and responsive thereto for producing a status parameter therefrom, said signal processing means including! means for deriving power variables from said power signals, said power variables including at least one of the statistical mean of the input power over time, the statistical standard deviation of input power over time, and the frequency of change of input power over time, said signal producing means further including means for producing said status parameter as a function of said at least one of said mean, standard deviation and frequency of change, said status parameter being indicative of the development status of the dough in the mixer.

14. The apparatus as set forth in claim 13, said signal processing means including means for deriving qualitative variables from said power variables, said qualitative variables representing a range of values regarding said power variables.

15. The apparatus as set forth in claim 14, said signal processing means including means for producing said status parameter from said qualitative variables.

16. An apparatus for preparing dough comprising:

a powered mixer;

sensing means for sensing the input power to said mixer and for producing power signals representative thereof; and signal processing means for receiving said power signals and responsive thereto for determining the development status of dough in said mixer, said signal processing means including means for deriving power variables from said power signals, said power variables including at least one of the statistical mean of the input power over time, the statistical standard deviation of input power over time, and the frequency of change of the input power over time, means for deriving from said power variables a set of qualitative variables related to the development status of the dough, memory means for storing at least one qualitative status parameter in association with conditions that can be satisfied by said qualitative variables, and means for determining whether said variables satisfy said conditions and for selecting said at least one status parameter upon satisfaction of said conditions.

17. The apparatus as set forth in claim 16, said qualitative variables including gluten development.

18. The apparatus as set forth in claim 16, said qualitative variables including water absorption.

19. The apparatus as set forth in claim 16, said memory means including means for storing a plurality of qualitative status parameters and for storing a set of conditional statement rules incorporating said qualitative status parameters and conditions.

20. The apparatus as set forth in claim 19, said rules including at least one rule for indicating the development status of the dough as one of said status parameters upon satisfaction of conditions concerning gluten development.

21. The apparatus as set forth in claim 20, said gluten development being subject to change, said conditions concerning gluten development including at least one of current gluten development, the change in gluten development and the elapsed mixing time of the dough.

22. The apparatus as set forth in claim 19, said rules including at least one rule for indicating the development status of the dough as one of said status parameter upon satisfaction of conditions concerning water development.

23. The apparatus as set forth in claim 22, said one status parameter including an indication concerning whether any change is needed in the relative amounts of water and flour in the dough.

24. The apparatus as set forth in claim 16 said qualitative variables being representative of respective ranges concerning said power signals.

25. The apparatus as set forth in claim 16, further including means for controlling the operation of said mixer in accordance with said at least one status parameter.

* * * * *